United States Patent [19]

Lassmann et al.

[11] Patent Number: 4,885,146
[45] Date of Patent: Dec. 5, 1989

[54] PROCESS FOR SCRUBBING OF NO AND/OR SO₂ FROM GAS MIXTURES

[75] Inventors: Eberhard Lassmann, Eurasburg; Robert Helmling; Franz Beran, both of Munich, all of Fed. Rep. of Germany

[73] Assignee: Linde Aktiengesellschaft, Wiesbaden, Fed. Rep. of Germany

[21] Appl. No.: 174,474

[22] Filed: Mar. 28, 1988

Related U.S. Application Data

[63] Continuation-in-part of Ser. No. 911,837, Sep. 26, 1986, abandoned.

[30] Foreign Application Priority Data

Sep. 27, 1985 [DE] Fed. Rep. of Germany ....... 3534526
Apr. 10, 1986 [DE] Fed. Rep. of Germany ....... 3612123

[51] Int. Cl.⁴ .................... C01B 21/00; C01B 17/00
[52] U.S. Cl. ...................................... 423/235; 423/243
[58] Field of Search ............... 423/242 A, 242 R, 243, 423/244 A, 244, 235

[56] References Cited

U.S. PATENT DOCUMENTS

| | | | |
|---|---|---|---|
| 3,538,631 | 11/1970 | Cantrell et al. | 423/243 |
| 3,681,015 | 8/1972 | Gelbein et al. | 423/243 |
| 3,767,777 | 10/1973 | Frye et al. | 423/243 |
| 4,418,044 | 11/1983 | Kulik | 423/235 |

Primary Examiner—Gregory A. Heller
Attorney, Agent, or Firm—Millen, White & Zelano

[57] ABSTRACT

A process is described for scrubbing of $NO_x$ and/or $SO_2$ from waste gases as, e.g., flue gases, which employs a scrubbing agent comprising Fe(II) ions in nonaqueous solvents. The scrubbing agent can be regenerated after its loading simply by heating and/or reduction of pressure, after which the scrubbing agent can be reused. A slight reduction of the Fe(II) ion concentration occurring by oxidation can be balanced by simple means. The process makes it possible to scrub out NO or $NO_x$ alone or together with $SO_2$. If $SO_2$ alone is to be scrubbed out of a gas mixture, addition of Fe(II) salt can be eliminated.

65 Claims, 1 Drawing Sheet

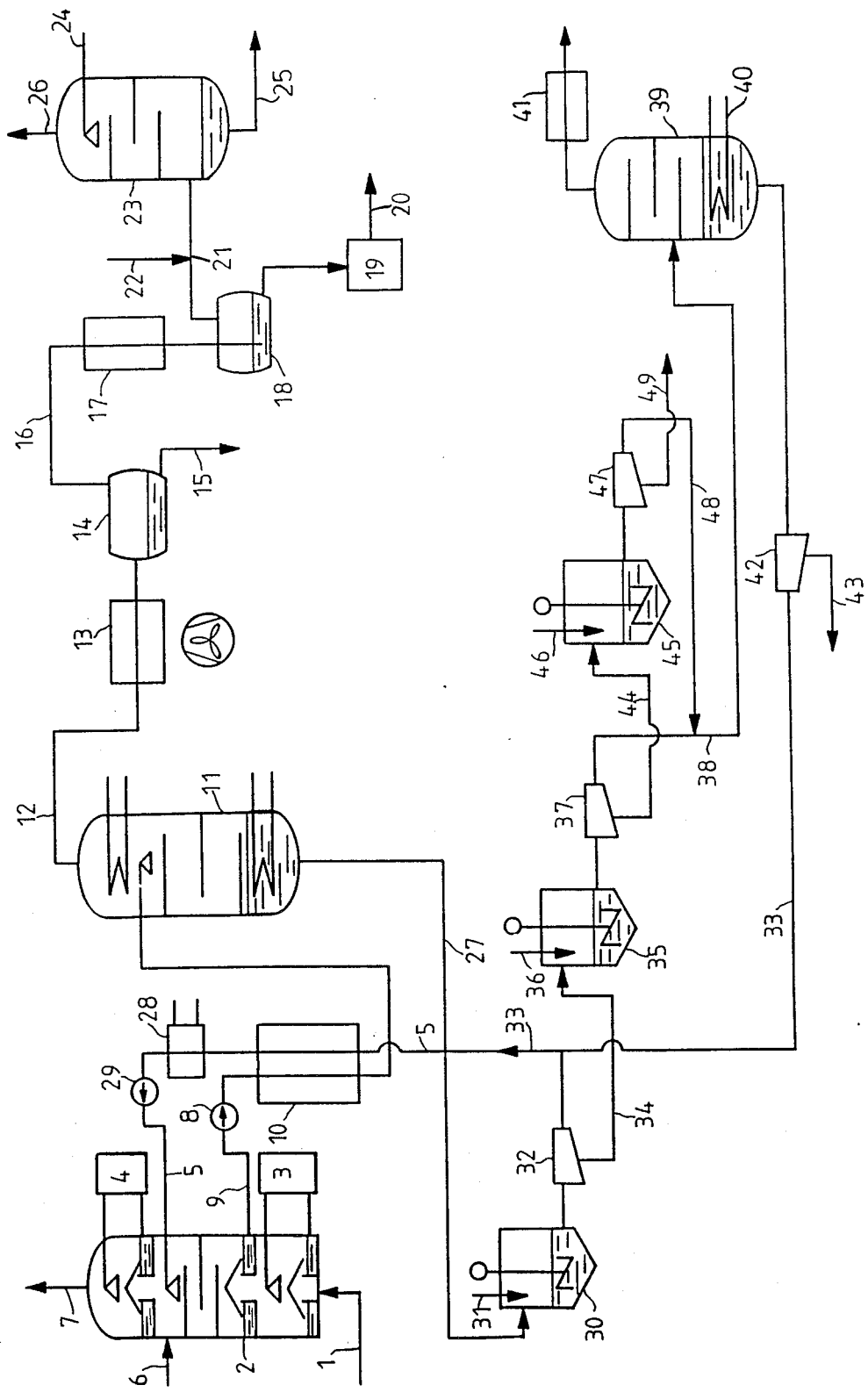

PROCESS FOR SCRUBBING OF NO AND/OR SO₂ FROM GAS MIXTURES

CROSS-REFERENCE TO RELATED APPLICATION

This application is a continuation-in-part of U.S. application Ser. No. 06/911,837, filed Sep. 26, 1988, now abandoned.

BACKGROUND OF THE INVENTION

This invention relates to a process and an apparatus for scrubbing of $NO_x$ and/or $SO_2$ from gas mixtures containing $NO_x$ and/or $SO_2$ with a scrubbing agent containing an iron(II) salt and solvent.

Air pollution, especially egregious during episodes of smog, has its origin mainly from the exhaust gases from fossil fuel power plants, other large-scale industrial facilities (e.g., iron and steel plants, petroleum refineries) and automobile exhaust gases. The main components of the air pollution are CO, $SO_2$, hydrocarbons, $NO_x$ and suspended particles. ($SO_2$ together with suspended particles is often considered as an indicator for the entire air pollution, and to appreciate the scope of the problem, it is noted that $SO_2$ emission by burning of sulfur-containing fossil fuels in the Federal Republic of Germany is estimated at several million tons yearly.) $SO_2$ is easily soluble in water and above all acts as an irritant to the mucous membranes of the upper and middle respiratory tract and of the eyes. $NO_x$ is formed from the elements in combustion processes. NO in the air is generally quickly oxidized to $NO_2$, which because of its high water solubility is resorbed in the lung alveoli and causes an irritating effect. In addition, any residual NO is considered to be an extraordinarily harmful air pollutant, because under the effect of ultraviolet radiation it can react with hydrocarbons, CO and water vapor, as they occur in automobile exhaust gases, to form photochemical oxidation products, especially ozone. Particularly harmful photochemical reaction products are organic peroxides and nitric acid compounds of peracetic acid, which have a considerable toxicity for the respiratory tract and which damage goods and vegetation.

Therefore, numerous known processes have been proposed, which aim at removing from flue gases $SO_2$, $NO_x$ or NO, alone or in combination, to prevent these materials from escaping into the atmosphere. In these efforts to solve the problem, the so-called dry and so-called wet processes are distinguished. In the case of wet processes, acid and alkali processes are distinguished. In the acid processes, the waste gases are scrubbed with cold nitric acid and the absorbed nitrogen oxides are fed back into the absorption system or catalytically oxidized by heating and/or air stripping. In the alkali processes, the waste gases are scrubbed with aqueous solutions of sodium, calcium or magnesium hydroxides or carbonates. However, these processes have not yet been able to provide complete satisfaction since they can be used only at high pressures of only at low pressures [(Ullmanns Encyklopaedie der technischen Chemie (Ullmanns Encyclopedia of Industrial Chemistry), 4th edition, volume 20, page 328)].

More recently a process has become known (U.S. Pat. No. 4,418,044, Kulik) which makes it possible to remove $NO_x$ and $SO_2$ simultaneously from waste gases, flue gases, etc. In this known process the operation is performed with solutions of iron(II) ions and $S_2O_3^{--}$ ions. The iron(II) ions as a rule are added in the form of sulfates, the $S_2O_3^{--}$ ions in the form of potassium or ammonium salts. As solvent for these substances, water is primarily used, but to which specific amounts of nonaqueous solvents, e.g., methanol or glycol, are added to increase the absorption of NO.

Kulik refers to the use of a "nonaqueous scrubbing solution". However, it is clear from the disclosure that by the term "nonaqueous" is meant an aqueous solution to which nonaqueous liquids have been added, e.g., alcohols. In column 3, lines 5–12, Kulik discloses that the alcohol in the scrubbing solution provides an "anhydrous environment" which improves the stability of the NO complex and that other "nonaqueous liquids" can be used "in combination with a ferrous thiosulfate scrubbing solution." In example 1 of Kulik, a scrubbing solution comprising a total of 240 mol containing 40 mol of methanol was used.

Moreover, this known process employs a molar ratio of $S_2O_3^{--}/Fe^{++}$ of about 5.0. Thus, this known process has the disadvantage of a very high consumption of chemicals. Thus, e.g., per mol of absorbed NO (30 g) 190 g of $K_2S_2O_3$ and 49 g of $H_2SO_4$ are consumed. Moreover, the known scrubbing agent apparently cannot be regenerated easily, if at all.

SUMMARY OF THE INVENTION

It is therefore an object of this invention to provide a process for removal of $NO_x$ and/or $SO_2$ from waste gases, flue gases, etc., which avoids the disadvantages of the known processes.

Another object of this invention is to provide a process for removal of $NO_x$ and/or $SO_2$ from gas mixtures by scrubbing wherein the scrubbing agent is reuseable.

Upon further study of the specification and appended claims, further objects and advantages of this invention will become apparent to those skilled in the art.

These objects are achieved according to the invention by a practically water-free nonaqueous solvent being used as the solvent in the scrubbing agent and also removing from the loaded scrubbing agent the absorbed $NO_x$ and /or $SO_2$ by regeneration thereby permitting subsequent reuse of the scrubbing agent.

Thus, in the process according to the invention, in contrast with the process known from U.S. Pat. No. 4,418,044, the operation is performed with a scrubbing agent which to a substantial extent consists of a nonaqueous solvent. In the ideal case the process according to the invention is performed with a water-free nonaqueous solvent. In the water-free condition the scrubbing agent according to the invention develops its greatest solvent power for NO and/or $SO_2$. However, it should be taken into consideration that flue gases, for example, are usually moist, so that the scrubbing agent absorbs certain amounts of water during the operation. In the regeneration of the scrubbing agent, water is also removed with the absorbed particles of the gas components, but a complete dehydration would require very long regeneration times and/or high regeneration temperatures. Both are too expensive in regard to usage of energy that for economical reasons a complete removal of water from the scrubbing agent is usually not sought. However, according to the invention 20% by weight, preferably 10% by weight, is to be considered as the upper limit for the water content of the scrubbing agent, since at higher water contents the NO absorption drops sharply.

A very important difference between the invention and the known processes resides in the fact that in the process according to the invention additional chemicals are not required during either absorption or regeneration.

In known processes the following additional chemicals are necessary: NaOH, NH₃, Ca(OH)₂, Na₂S, H₂SO₄ (see "Fortschritt-Berichte der VDI-Zeitschriften", Reihe 3, Nr. 75, pages 43–47 (1982)).

Suitable organic compounds for use as the nonaqueous solvent of the scrubbing agent include those of formula I $$R_1-CH_2-CHR_2-R_3 \quad (I)$$

wherein $R_1$ = OH
= O alkyl
= keto group
or = ester group

$R_2$ =

= H
or = OH
$R_3$ = CH₂OH
= OH
= O alkyl
= keto group
= ester group
= alkyl O (cyclic)
= (O—CH₂—CH₂)$_n$—O alkyl
or = (O—CH₂—CH₂—CH₂)$_n$—O alkyl
   with n = 1 to 10 and/or those of formula II $$R_4-CH_2-CH_2-CH_2-R_5 \quad (II)$$

wherein $R_4$ = OH
= O alkyl
= keto group
or = ester group
$R_5$ = OH
= O alkyl
= keto group
= ester group
= (O—CH₂—CH₂—CH₂)$_n$—O alkyl
or = (O—CH₂—CH₂)$_n$—O alkyl
   with n = 1 to 10.

In formula I, when $R_1$ is an O alkyl group, the alkyl portion preferably contains 1 to 10, in particular 1 to 3, C atoms. For example, $R_1$ can be methyl or ethyl.

When $R_1$ is a keto group, the group is preferably in the form of COR₆ wherein R₆ is an alkyl group of 1 to 10, preferably 1 to 4, C atoms. For example, R₆ can be methyl or ethyl.

When $R_1$ is an ester group, the ester group is preferably in the form of COOR₇ wherein R₇ is an alkyl group of 1 to 10, preferably 1 to 3, C atoms. For example, R₇ can be ethyl.

In addition, when $R_1$ is an ester group, the ester group is also preferably an ester of an inorganic acid such as, for example, a mono-, di-, or triester of phosphoric acid or of phosphonic acid.

When $R_2$ is

the carbon atom can be preferably unsubstituted or substituted with alkyl groups of 1 to 5, in particular 1 to 2, C atoms. For example, $R_2$ can be methyl or ethyl.

Also in formula I, when $R_3$ is an O alkyl group, the alkyl portion preferably contains 1 to 10, in particular 1 to 3, C atoms. For example, the alkyl can be methyl or ethyl.

When $R_3$ is a keto group, the keto group can preferably be of the formula COR₈ wherein R₈ is an alkyl group of 1 to 10, in particular 1 to 4, C atoms. For example, R₈ can be methyl or ethyl.

When $R_3$ is an alkyl O group, the alkyl preferably is a cyclic alkyl group with 5 to 6 C atoms. For example, the alkyl can be cyclohexyl. The cyclic structure may also contain other atoms, such as O, N, S or P.

When $R_3$ is an (O—CH₂—CH₂)$_n$—O alkyl group, the alkyl portion preferably contains 1 to 10, in particular 1 to 4, C atoms and n is preferably 1 to 10. For example, $R_3$ can be (O—CH₂—CH₂)₄—O—C₂H₅.

When $R_3$ is an (O—CH₂—CH₂—CH₂)$_n$—O alkyl group, the alkyl portion preferably contains 1 to 10, in particular 1 to 4, C atoms and n is preferably 1 to 10. For example, $R_3$ can be (O—CH₂—CH₂—CH₂)₃—O—CH₃.

In formula II, when $R_4$ is an O alkyl group, the alkyl portion preferably contains 1 to 10, in particular 1 to 4, C atoms. For example, the alkyl can be methyl or ethyl.

When $R_4$ is a keto group, the group is preferably in the form of COR₉ wherein R₉ is an alkyl group of 1 to 10, preferably 1 to 4, C atoms. For example, R₉ can be methyl or ethyl.

When $R_4$ is an ester group, preferably the ester group is COOR₁₀ wherein R₁₀ is an alkyl group of 1 to 10, preferably 1 to 3, C atoms. For example, R₁₀ can be ethyl.

In addition, when $R_4$ is an ester group, another preferred group is of an inorganic acid such as, for example, a mono-, di-, or triester of phosphoric acid or of phosphonic acid.

Also in formula II, when $R_5$ is an O alkyl group, the alkyl portio preferably contains 1 to 10, in particular 1 to 3, C atoms. For example, the alkyl can be methyl or ethyl.

When $R_5$ is a keto group, the keto group can preferably be of the formula COR₁₁ wherein R₁₁ is an alkyl group of 1 to 10, in particular 1 to 4, C atoms. For example, R₁₁ can be methyl or ethyl.

When $R_5$ is an (O—CH₂—CH₂)$_n$—O alkyl group, the alkyl portion preferably contains 1 to 10, in particular 1 to 4, C atoms and n is preferably 1 to 10. For example, $R_5$ can be (O—CH₂—CH₂)₅—O—CH₃.

When $R_5$ is an (O—CH₂—CH₂—CH₂)$_n$—O alkyl group, the alkyl portion preferably contains 1 to 10, in particular 1 to 4, C atoms and n is preferably 1 to 10. For example, $R_5$ can be (O—CH₂—CH₂—CH₂)₃—O—C₂H₅.

For example, mono and diethers of oligoethylene and propylene glycols are suitable as nonaqueous solvents for the purposes of the process according to the invention.

Compounds from the group of formula I that have proven to be particularly suitable according to the invention are tetrahydrofurfuryl alcohol, acetonylacetone and especially tetraethylene glycol dimethyl ether, the latter being extraordinarily stable in regard to flue gas.

Also, dimethyl sulfoxide is a highly suitable solvent according to the invention. Furthermore, phosphoric esters are also very suitable as solvents, since, besides having a very good solvent power for NO, they have the advantage of very low viscosity at very high boiling points. Namely, mono-, di- and triesters are suitable, whereby the mono- and diesters can be substituted on the phosphorus atom. As an example for these phosphonium compounds triethylphosphonoacetate may be mentioned.

In case there are special requirements in regard to melting point, boiling point, viscosity, etc. of the scrubbing agent it is possible according to the invention to use a mixture of any of the above listed solvents.

As discussed previously, in the process of Kulik the alcohol component of the scrubbing solution is used to provide an anhydrous environment which improves the stability of the NO complex formed during absorption. Furthermore, Kulik discloses that other non-aqueous liquids can be substituted in place of the alcohol. Of course, any non-aqueous liquid which is substituted for the alcohol must not deleteriously affect the overall solvent ability of the scrubbing agent with regard to dissolution of the sources of $Fe^{+2}$ and $S_2O_3^{-2}$ ions. In the table below, the solubility of $(NH_4)_2S_2O_3$ in grams per liter is provided for several scrubbing agents containing 20% by weight water and the remainder a nonaqueous liquid. Generally, the solubilities are low except for the cases where ethylene glycol is employed as the non-aqueous component. For comparison, Kulik disclose at Col. 2, Lines 33-38, that, for an $S_2O_3^{-2}/FeSO_4$ mole ratio of 5, NO absorption is 92% for an $S_2O_3^{-2}$ ion concentration of 3.32 mole/liter (372 g/l) and 70% for an $S_2O_3^{-2}$ ion concentration of 1.3 mole/liter (145.6 g/l).

| Scrubbing Agent (including 20 weight % $H_2O$) | Solubility of $(NH_4)_2 S_2O_3$ in g/l |
|---|---|
| Agent of Example I below without additives | below 10 (phase separation) |
| dimethylsulfoxide | 40 to 50 |
| methanol | 30 to 40 |
| ethanol | below 10 (phase separation |
| glycerin | 220 to 230 |
| tetrahydrofurfuryl alcohol | 20 to 30 (phase separation) |
| ethylene glycol | 380 to 400 |
| tributylphosphate* | below 10 (phase separation |

*Water saturated with about 5 weight % $H_2O$.

"Phase separation" means that the mixture is separated into an aqueous rich phase and an organic phase with the aqueous phase containing the bulk of the salt while the organic phase exhibits the known low solubility for the salt.

The solubilities provided in the above table are also relevant to the solubility of $K_2S_2O_3$ in the listed scrubbing agents, since the solubility behavior of $K^+$ ions and $NH_4^+$ ions is similar. As a further point, in the above-listed scrubbing agents, if HCl or another acid is added thereto, the thiosulfate ion becomes unstable and decomposes resulting in the precipitation of sulfur.

For the purposes of the invention the solvents suitable for use in the scrubbing agent are selected preferably with respect to the following parameters:
 boiling point: 150-300° C.
 melting point: below 50° C.
 chemical stability to $O_2$, $SO_2$, NO
 thermal stability
 ecological harmlessness
 high solubility to $NO_2$ and $SO_2$ and low solubility to $CO_2$.

Generally, the scrubbing agents according to the invention exhibit a minimum solubility of NO of about 500 ml/liter of solvent (STP) at an NO partial pressure of 0.85 mbar (temperature equals 25° C.). Similarly, the scrubbing agents exhibit a minimum solubility of $SO_2$ of about 200 ml/liter of solvent (STP) at a $SO_2$ partial pressure of 0.1 mbar. With respect to $CO_2$, the scrubbing agents according to the invention exhibit a maximum solubility of 2,000 ml/liter of solvent (STP) at a $CO_2$ partial pressure of 0.1 bar.

In contrast to the process of Kulik, the process according to the invention does not require the presence of thiosulfate ($S_2O_3^{--}$) ions. This result is surprising in view of the disclosure of Kulik in regard to NO absorption by complex formation with the thiosulfate ions and the high molar ratio of $S_2O_3^{--}/Fe^{++}$ employed in the examples. In the process according to the invention, thiosulfate ions are preferably not added to the scrubbing agent. Under acidic conditions, the thiosulfate ions would not be stable in the scrubbing agents. The ions decompose resulting in the formation of elemental sulfur. For this reason, the thiosulfate ion content of the scrubbing agents according to the invention is preferably below about 1 g/l.

A further important feature according to the process of the invention is that the divalent iron used in the scrubbing agent be in the form of its halides, especially in the form of the chloride. It does not seem to be critical whether $FeCl_2$ is added directly to the scrubbing agent or whether chloride ions in the form of another chlorine compound, e.g., HCl, are added to a solution of Fe(II) ions. The addition of hydrochloric acid is advantageous because, as was also established according to the invention, a small amount of acid in the scrubbing agent, about 0.1 to 1% by weight, has a favorable effect on the absorption process and stability of the $Fe^{++}$.

Preferably, the scrubbing agent has a pH of about 1 to 2. Further, it has proved advantageous to add to the scrubbing agent, especially when ether forms of the solvents are used, an oxidation inhibitor, e.g., 4,4'-butylidenebis(6-tert-butyl-m-cresol). Preferably, about 0.1 to 1% by weight 4,4'-butylidenebis(6-tert-butyl-m-cresol) is added to the scrubbing agent.

The concentrations in which $Fe^{++}$ is added to the scrubbing agent lie in the range of about 0.04-1 mol/1 = 2.2—56 g/1, preferably 0.04-0.5, especially in the range of about 0.1-0.2 mol/1 = 5.6—11.2 g/1. A preference as to the ratio of $Fe^{+2}$ ions to NO present in the gas being treated (e.g., moles/l to mbar) cannot be easily expressed since the solubility of NO is not linear with respect to its partial pressure. A linear relationship would be typical for a physical solvent, however, in the present case the scrubbing agent acts as a chemical solvent with the formation of a complex between $Fe^{+2}$ ions and NO. Generally, though, the ratio of $Fe^{+2}$ to NO is 0.08–0.5 mole/1 NO, preferably 0.1–0.2 mole/1 NO.

The structure of the NO-complex has not been determined, although it is known that the complex exhibits a very strong green or blue color. At saturation, the proportion of NO to $Fe^{+2}$ amounts to about 1:1.

By the process according to the invention, gases having an NO content of preferably about 80–2,000 vppm can effectively be treated for removal of $NO_x$. Preferably, the scrubbing agent employed in the process contains a sufficient amount of $Fe^{+2}$ ions to bind substantially all of the $NO_x$ contained in the gas to be treated. After treatment by the inventive process, the treated gases possess an $NO_x$ concentration of about 1–80, preferably 10–50 vppm NO.

By the process according to the invention it is possible to remove both $NO/NO_x$ alone and $NO/NO_x$ together with $SO_2$ from industrial gas mixtures such as, e.g., flue gas. The $NO_2$ if present in the gas is scrubbed out with the NO on the basis of natural physical laws. The scrubbing agent can be regenerated by steam in a conventional manner. The condensate from the regeneration steam has an extremely slight solubility for NO, so that in the regeneration, if the scrubbing agent is loaded only with $NO/NO_x$, a highly concentrated NO-rich gas can be obtained, which by oxidation with air (without catalyst), can very easily be converted to $NO_2$ and then to concentrated nitric acid.

If it is not intended to produce $HNO_3$, it is possible to reduce $NO_x$ to $N_2$ with $NH_3$ in the presence of $O_2$, in order to make the $NO_x$ innocuous (see KIRK-OTHMER, Encyclopedia of Chemical Technology, 3.Ed., Vol. 9, pages 529–530).

If $SO_2$ is to be removed at the same time with the NO, this can be accomplished in the same step of removal of the NO, without resorting to other process steps or chemicals, because the solvents proposed according to the invention have a very good solubility in regard to $SO_2$. The $SO_2$ does not go into any reaction with the iron(II) ions but is dissolved purely physically by the nonaqueous solvent. Both dissolved components can then, like the NO alone, be stripped with steam from the scrubbing agent.

There are two procedures for further treatment of the $NO-SO_2$-rich gas. The first procedure includes condensing out the $SO_2$ which, because of the great difference in boiling points in relation to NO, is easily possible. The NO-rich flue gas, substantially free of $SO_2$, is then oxidized by addition of air or oxygen, whereby in a known way (without pressure, without catalyst, and at about 20 to 30° C.) $NO_2$ is formed. The $NO_2$ is then dissolved in water to form nitric acid. The residual gases can be recycled back to a point upstream of the scrubbing step.

The second procedure involves directly oxidizing $SO_2$-NO-rich gas with air or oxygen and bringing it in contact with water whereby a mixture of sulfuric and nitric acid is produced. In this case, the reactions take place in a way similar to that in the case of the known lead-chamber process, as disclosed in Ullmanns Encyklopaedia der technischen Chemie, 3. Auflage, Band 15, pages 432–433.

This acid mixture can be used directly for fertilizer production, for example, by neutralization with Mg, Ca or K carbonates or hydroxides or with $NH_3$. Alternatively, the mixture can be separated into sulfuric acid and nitric acid according to known processes, e.g., by distillation. The residual gases can either be recycled back to a point upstream of the scrubbing step or they can be worked up in separate steps.

If the $SO_2$ is to be scrubbed out separately from the NO, then the installation of two separate scrubbing circuits is necessary. The first then serves for removal of the $SO_2$, the second for removal of the NO. In this case it is advisable in the first scrubbing circuit to let the scrubbing agent according to the invention circulate without addition of Fe(II) salts, but in the second to circulate with Fe(II) salts. This has the advantage that the same solvent travels in both scrubbing circuits so that overflow from one into the other circuit does not cause trouble.

However, it is also possible in principle to remove the $SO_2$ with any other suitable scrubbing agent, e.g., a known milk of lime scrubbing solution, and then remove the NO with the scrubbing agent according to the invention. The invention therefore makes it possible to equip existing flue gas purification installations, which are already equipped with an $SO_2$ scrubbing but are unsatisfactorily or not at all equipped for removal of NO, with a subsequent or fine purification stage which assures a practically complete NO removal.

It was determined that the Fe(II) ions used in the NO absorption process, depending on the $O_2$ or $NO_2$ content of the gas to be purified, are more or less quickly oxidized to inactive Fe(III) ions. It has been surprisingly shown that an addition of Fe(III) salts very considerably reduces the oxidation rate. Thus, it has proved advantageous to add to the scrubbing agent according to the invention Fe(III) ions in an amount which corresponds to 1- to 6-fold, preferably 2- to 3-fold the amount of dissolved Fe(II) ions.

Since by the addition of Fe(III) ions the oxidation of Fe(II) ions can indeed be slowed down considerably but not entirely suppressed, it is necessary to increase, from time to time or continuously, the concentration of the Fe(II) ions in the scrubbing agent or in a partial amount of the scrubbing agent.

There are several methods to choose from according to the invention for increasing the concentration of Fe(II) ions:

(A) Addition of aqueous hydroxylamine hydrochloride solutions, (B) Electrolysis for cathode reduction, (C) Addition of metal iron.

Process A has the advantage that in the reaction no products are formed which could disturb the scrubbing process or the further processing of the gases. Moreover, the reaction takes place, in relation to the hydroxyl, with 60 to 95% yield and in a very short time (10 to 60 sec).

Process B is linked to the presence of electric current. Still, it is available cheaply as a rule, especially, of course, in flue gas purification at power plants. As cathode materials practically all marketable materials are suitable, preferably iron or nickel. As anode materials all marketable materials, preferably carbon or graphite, are suitable. The form and arrangement of the electrodes and diaphragm play a role in the economic efficiency of the electrolytic reduction but not for their ability to function. Care must merely be taken to ensure that the scrubbing liquor passes through the reaction spaces as uniformly as possible. According to the invention the temperature of the electrolysis cell can be in the range of 0 to 100° C. However, the most favorable current efficiencies are reached in the range of 10 to 30° C.

However, process C according to the invention has proven most advantageous for the reduction of excessive Fe(III) ions. Since the scrubbing medium as a rule is slightly acidic, either because of the acidic components contained in the flue gas or because of addition of an acid, the reaction between elementary iron and the Fe(III) ions to form Fe(II) ions takes place smoothly. The elementary iron can be fed upstream of the head of the scrubbing column in the form of powder, cuttings, sheet pieces, etc. This kind of reduction according to the invention of excess Fe(III) ions has the outstanding advantage that in the reaction no types of products result other than those that in any case are present in the scrubbing agent. However, in this process a concentration of Fe(III) ions occurs, which in extended operating periods make measures for their removal necessary.

As was mentioned above, it is not necessary to treat the entire amount of scrubbing agent but it suffices to divert a partial stream, about 0.01 to 0.1% by weight, from the circulating scrubbing agent, and subject it to a treatment, which causes a reduction of the Fe(III) ion concentration by separation. According to the invention this can occur with ion exchangers. However, two variants according to the invention have particularly proven to be reliable, which are briefly described below:

(C1) Vacuum distillation (C2) Precipitation with aqueous sodium hydroxide solution.

In process variant C1 a diverted partial stream of the scrubbing agent loaded with salts to be removed is completely subjected to vacuum distillation.

Process variant C1 is preferably performed after regeneration, i.e., after removal of $NO_x/SO_2$ components from the scrubbing agent, but before cooling of the scrubbing agent, so that the latter is introduced into variant C1 at approximately 80 to 100° C.

The organic solvent can in this case be distilled off from the remaining constituents without any problem. As can be established, the hydrochloric acid dissolved in the scrubbing agent goes into the distillate and thus can immediately be reused in the scrubbing, which contributes to the reduction of operating costs. The remaining bottoms remain pumpable and can be disposed of in a dump site.

Although the Fe ions in the solvents according to the invention are complexed, it is surprisingly possible to predcipitate them with aqueous NaOH solution according to $$FeCl_3 + 3NaOH = 3NaCl + Fe(OH)_3.$$

According to the invention in this case it is favorable to use a 50% NaOH solution so as to introduce as little water as possible into the scrubbing agent. It has been shown that concentrated NaOH solution is practically insoluble in the solvents according to the invention. Since NaCl is surprisingly slightly soluble in the solvents according to the invention, the neutralization products of the above reaction are all precipitated and can easily be separated from the solvent by settling or filtration.

The superiority of the scrubbing agent according to the invention over the known aqueous Fe(II) salt solution is illustrated by some numbers.

NO equilibrium loading (1) Scrubbing agent with 0.1 mol/l $Fe^{++}$ ions flue gas with 0.85 mbar NO partial pressure temperature 25° C.

| Solvent | Equilibrium loading (ml NO/l) |
| --- | --- |
| diethylene glycol monoethyl ester | 1200 |
| triethylene glycol dimethyl ether | 510 |
| tetrahydrofurfuryl alcohol | 820 |
| dimethyl sulfoxide | 520 |
| acetonylacetone | 1010 |
| 60-80% wt tetraethyleneglycol dimethyl ether | |
| 15-25% wt triethylene glycol dimethyl ether | |
| 2.5-7.5% wt pentaethylene glycol dimethyl ether | |
| 2.5-7.5% wt pentaethylene glycol monomethyl ether | 1750 |

(2) Scrubbing agent with 0.1 mol/l $Fe^{++}$ ions and 0.15 mol HCl flue gas with 0.56 mbar NO partial pressure temperature 25° C.

| Solvent | Equilibrium loading (ml NO/l) |
| --- | --- |
| trimethyl phosphate | 613 |
| tributyl phosphate | 1664 |
| triethyl phosphonoacetate | 1850 |

(3) Scrubbing agent with various $Fe^{++}$ concentrations flue gas with 0.85 mbar NO partial pressure temperature 25° C.

| Solvent | |
| --- | --- |
| 60-80% wt | tetraethylene glycol dimethyl ether |
| 15-25% wt | triethylene glycol dimethyl ether |
| 2.5-7.5% wt | pentaethylene glycol dimethyl ether |
| 2.5-7.5% wt | pentaethylene glycol monomethyl ether |

| $Fe^{++}$ concentration (mol/l) | Equilibrium loading (ml NO/l) |
| --- | --- |
| 0.06 | 1180 |
| 0.10 | 1750 |
| 0.15 | 2700 |

(4) Scrubbing agent: water with 0.95 mol/l $Fe^{++}$ ions and 0.2 mol/l $H_2SO_4$ flue gas with 0.85 mbar NO partial pressure temperature 25° C.

| Equilibrium loading |
| --- |
| 68 ml NO/l |

These figures alone show that the scrubbing agent according to the invention surpasses the known aqueous Fe(II) salt solution in solvent power for NO by one to two orders of magnitude.

Absorption Rate

However, besides the equilibrium loading, the absorption rate for the components to be removed is an essential quantity for the economic efficiency of a gas scrubbing operation. Here also the solvent according to the invention is far superior to known solvents.

Thus, the above-mentioned solutions (1) and (3) reach 80 to 90% of their saturation loading in 70 sec., while solution (4) after this same time period reached only about 5% of its saturation loading.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

BRIEF DESCRIPTION OF THE DRAWING

Various other objects, features and attendant advantages of the present invention will be more fully appreciated as the same become better understood when considered in connection with the accompanying drawing which illustrates an embodiment wherein a simultaneous NO and $SO_2$ scrubbing of flue gas is performed, whereby small amounts of elementary iron are added to the scrubbing column from time to time.

350,000 $Nm^3/H$ of flue gas with 500 Vppm NO and 900 Vppm $SO_2$ enters by pipe 1 upward into a scrubbing column Scrubbing column 2 includes a lower, middle and upper section. In the lower section, the flue gas is scrubbed with water to remove dust, soot, HCl and HF. The working up of the water carrying the dirt load is diagrammatically represented by block 3. In the upper section of scrubbing column 2 another water scrubbing circuit is installed, whose working up is diagrammatically represented by block 4, which has the object of removing the entrained droplets of scrubbing agent from the middle section of scrubbing column 2, to keep the losses of scrubbing agent low.

The flue gas, thus prepurified, goes from the lower section into the middle section of scrubbing column 2, where it is sprayed with 800 $m^3/h$ of scrubbing agent (components, see example VI), delivered by pipe 5. The scrubbing agent thus absorbs the NO and $SO_2$ contained in the flue gas. To replace the Fe(II) contained in the scrubbing agent, whose concentration gradually decreases due to formation of Fe(III) by oxidation, powered iron can be introduced into the scrubbing column from time to time by pipe 6. The scrubbed flue gas then goes into the upper section of scrubbing column 2, is freed of the entrained scrubbing agent and leaves the installation by pipe 7.

Loaded scrubbing agent is drawn off with a pump 8 by pipe 9, heated in heat exchanger 10 and fed into the upper part of a regenerating column 11, which is equipped with bottom heating and head cooling. In this regenerating column 11 the loaded scrubbing agent is freed, by heating, of the gas components NO and $SO_2$ dissolved therein, which leave the column as rich gas by pipe 12.

The rich gas is cooled in air condenser 13 and the water thus condensing is separated from the gas in separator 14 and removed by pipe 15. This is 5 t/h at most. About 700 $m^3/h$ of rich gas then arrives by pipe 16 into condenser 17, in which the temperature is below the condensation temperature of the $SO_2$. The condensing $SO_2$ (860 kg/h) is separated from the gas in separator 18 and worked up to sulfuric acid in an installation represented as block 19. The installation delivers about 1310 kg/h of $H_2SO_2$ by pipe 20.

The NO-rich gas escaping from separator 18 by pipe 21 is mixed with air introduced by pipe 22 and fed to a trickling tower 23, in which it is sprayed with water (pipe 24) and thus, by intermediate formation of nitrous acid, is converted into 40 to 50% nitric acid. 440 kg/h of $HNO_3$ can be removed from the installation by pipe 25. Unreacted gas as a rule is recycled via pipe 26 to the flue gas that is to be treated.

The regenerated scrubbing agent flows from the bottom of regenerating column 11 by pipe 27. A part of the scrubbing agent is pumped via pipe 5 through heat exchanger 10 and water condenser 28 by a pump 29 to the middle section of scrubbing column 2, while the rest, namely 340 l/h is transferred to an agitated vessel 30. A suitable amount of 50% aqueous NaOH solution is fed to agitated vessel 30 by pipe 31 to precipitate the Fe(III) ions contained in the scrubbing agent as Fe(OH)$_3$.

The reaction mixture then is delivered to a decanter 32. Scrubbing agent with a reduced content of Fe(III) ions is removed from decanter 32 by pipe 33 and delivered to pipe 5, while Fe(OH)$_3$ slurry is removed by pipe 34 and delivered to a second agitated vessel 35 where it is diluted with water (pipe 36).

The mixture in vessel 35 is then delivered to a second decanter 37. After settling of the slurry, the supernatant scrubbing agent is fed by pipe 38 to a stripping column 39, where the scrubbing agent is supplied, by heating with a steam coil 40, with heat which causes evaporation, which is drawn off from the head of column 39 and liquefied in a water condenser 41. The bottom liquid flows into a decanter 42, where NaCl settles. The NaCl is transferred by pipe 43 to a dump site, while desalted scrubbing agent is delivered to pipe 5 by pipe 33.

Slurry from decanter 37 is transferred by pipe 44 into a third agitated vessel 45 and mixed once again with water (pipe 46). A separation into scrubbing agent and slurry occurs in a decanter 47. The scrubbing agent is transferred to pipe 38 by pipe 48, while the slurry is carried by pipe 49 to a dump site.

In the preceding text and the following examples, all temperatures are set forth uncorrected in degrees Celsius and all parts and percentages are by weight, unless otherwise indicated.

EXAMPLE I

Simultaneous scrubbing out of NO and $SO_2$ (1) Composition of the flue gas (in relation to water-free gas) at 25° C.

| | |
|---|---|
| $CO_2$ | 9% by vol |
| $O_2$ | 7% by vol |
| $SO_2$ | 511 Vppm |
| NO | 480 Vppm |
| $N_2$ | residue |

(2) Composition of the scrubbing agent (in relation to dry base):

| | |
|---|---|
| 60–80% wt | tetraethylene glycol dimethyl ether |
| 15–25% wt | triethylene glycol dimethyl ether |
| 2.5–7.5% wt | pentaethylene glycol dimethyl ether |
| 2.5–7.5% wt | pentaethylene glycol monomethyl ether |
| with 2% wt | $FeCl_2$—$4H_2O$ |
| 1% wt | 4,4'-butylidenebis(6-tert-butyl-m-cresol) |
| 0.1% wt | $H_2SO_4$ |
| 0.5% wt | HCl. |

(3) Scrubbing column:

| | |
|---|---|
| diameter | 100 mm |
| packing level | 1500 mm |
| packing body | 15 × 15 Berl saddles |
| gas throughput (upward) | 25 $Nm^3/h$ | scrubbing agent feed (downward)   50 l/h (4) Result:
At the output of the scrubbing the content of the purified gas in $SO_2$ had dropped to 3 Vppm, in NO to less than 5 Vppm.

(5) Regeneration
The regeneration took place at 80 to 90° C. in a vacuum, whereby a $SO_2$- and NO-rich gas of the following composition was obtained (in relation to water-free gas):

| | |
|---|---|
| NO | 40.2% by vol |
| $SO_2$ | 40.1% by vol |
| $N_2$, $CO_2$ | residue |

EXAMPLE II

Removal of nitrogen oxides from a $SO_2$-free flue gas
(1) Composition of the flue gas (in relation to water-free gas) at 25° C.

| | |
|---|---|
| $CO_2$ | 9.8% by vol |
| $O_2$ | 6.3% by vol |
| NO | 800 Vppm |
| $N_2$ | residue |

(2) Composition of the scrubbing agent (in relation to dry base):

| | |
|---|---|
| 60–80% wt | tetraethylene glycol dimethyl ether |
| 15–25% wt | triethylene glycol dimethyl ether |
| 2.5–7.5% wt | pentaethylene glycol monomethyl ether |
| with 2.6% wt | $FeCl_2$—$4H_2O$ |
| 1% wt | 4,4'-butylidenebis(6-tert-butyl-m-cresol) |
| 0.1% wt | $H_2SO_4$ |
| 0.5% wt | HCl. |

(3) Scrubbing column:

| | |
|---|---|
| diameter | 100 mm |
| packing level | 1500 mm |
| packing body | 15 × 15 Berl saddles |
| gas throughput (upward) | 25 Nm$^3$/h |
| scrubbing agent feed (downward) | 50 l/h |

(4) Result:
At the output of the scrubbing the content of the scrubbed gas in NO had dropped to under 10 Vppm.

(5) Regeneration
The regeneration took place at 80 to 90° C. in a vacuum, whereby a NO-rich gas of the following composition was obtained (in relation to water-free gas):

| | |
|---|---|
| NO | 85% by vol |
| $N_2$, $CO_2$ | residue |

EXAMPLE III

Simultaneous NO and $SO_2$ scrubbing from synthetic flue gas
(1) composition of flue gas at 22° C.

| | |
|---|---|
| $CO_2$ | about 10% by vol |
| $O_2$ | about 5% by vol |
| NO | see Table 1 |
| $SO_2$ | |
| $N_2$ | residue |
| $H_2O$ | dew point about 15° C. |

(2) Composition of the scrubbing agent:

| | |
|---|---|
| 60–80% wt | tetraethylene glycol dimethyl ether |
| 15–25% wt | triethylene glycol dimethyl ether |
| 2.5–7.5% wt | pentaethylene glycol dimethyl ether |
| 2.5–7.5% wt | pentaethylene glycol monomethyl ether |
| with 3.7% wt | $FeCl_2$—$4H_2O$ |
| 0.9% wt | 4,4'-butylidenebis(6-tert-butyl-m-cresol) |
| 0.45% wt | HCl |
| 1.5% wt | $H_2O$ |

| (3) | Scrubbing column | |
|---|---|---|
| | diameter | 27 mm |
| | packing level | 450 mm |
| | packing body | 5 × 5 Berl saddles |
| (4) | Result | |
| | See Table 1. | |
| (5) | Regeneration | |

The regeneration took place in a regenerating column of the same structure as the scrubbing column at about 80° C. with 230 l/h of $N_2$ as regeneration gas

EXAMPLE IV

Simultaneous NO and $SO_2$ scrubbing from synthetic flue gas
(1) Composition of flue gas at 22° C.

| | |
|---|---|
| $CO_2$ | about 10% by vol |
| $O_2$ | about 5% by vol |
| NO | see Table 2 |
| $SO_2$ | |
| $N_2$ | residue |
| $H_2O$ | dew point about 15° C. |

(2) Composition of the scrubbing agent: tributyl phosphate

| | |
|---|---|
| with 3.2% wt | $FeCl_2$—$4H_2O$ |
| 0.4% wt | HCl |
| 1.3 wt | $H_2O$ |

(3) Scrubbing column:

| | |
|---|---|
| diameter | 27 mm |
| packing level | 450 mm |
| packing body | 5 × 5 Berl saddles |

(4) Result
See Table 2.
(5) Regeneration
The regeneration took place in a regenerating column of the same structure as the scrubbing column at about 80° C. with 100 l/h of $N_2$ as regeneration gas.

EXAMPLE V

Simultaneous NO and $SO_2$ scrubbing from synthetic flue gas with addition of Fe
(1) Composition of flue gas (in relation to water-free gas) at 25° C.

| | |
|---|---|
| CO₂ | about 10% by vol |
| O₂ | |
| NO | see Table 3 |
| SO₂ | |
| N₂ | residue |

(2) Composition of the scrubbing agent (in relation to dry base):

| | |
|---|---|
| 60-80% wt | tetraethylene glycol dimethyl ether |
| 15-25% wt | triethylene glycol dimethyl ether |
| 2.5-7.5% wt | pentaethylene glycol dimethyl ether |
| 2.5-7.5% wt | pentaethylene glycol monomethyl ether |
| with 2.0% wt | FeCl₂—4H₂O |
| 4.9% wt | FeCl₃—6H₂O |
| 1.0% wt | 4,4'-butylidenebis(6-tert-butyl-m-cresol) |
| 0.5% wt | HCl |

(3) Scrubbing column:

| | |
|---|---|
| packing level | 450 mm |
| packing body | 5 × 5 Berl saddles |
| temperature | about 22° C. |
| gas throughout (upward) | see Table 3 |
| scrubbing agent feed (downward) | see Table 3 |
| iron powder feed: 2 g (by portions) | |
| Fe(II) content: 5–10 g/l | |

(4) Result
See Table 3.
(5) Regeneration
The regeneration took place in a regenerating column at about 80° C. with 230 l/h of N₂ as regeneration gas.

EXAMPLE VI

Simultaneous NO and SO₂ scrubbing from flue gas with addition of iron and salt removal
(1) Composition of the flue gas:

| |
|---|
| 350,000 Nm³ flue gas with 500 ppm NO 900 ppm SO₂ 6% O₂ |

(2) Composition of the scrubbing agent:
(a) at the start

| | |
|---|---|
| 180.0 t | 60-80% wt tetraethylene glycol dimethyl ether |
| | 15-25% wt triethylene glycol dimethyl ether |
| | 2.5-7.5% wt pentaethylene glycol dimethyl ether |
| | 2.5-7.5% wt pentaethylene glycol monomethyl ether |
| | with 12.6 t conc. hydrochloric acid (33%) = 4.2 t HCl 4.05 t C 7.10 t C |
| 18.0 t FeCl₃—6H₂O | 3.73 t Fe |
| 0.4 t Fe pellets | 0.40 t Fe |

(b) in operation:

| | |
|---|---|
| 180.0 t | 60-80% wt tetraethylene glycol dimethyl ether |
| | 15-25% wt triethylene glycol dimethyl ether |
| | 2.5-7.5% wt pentaethylene glycol dimethyl ether |
| | 2.5-7.5% wt pentaethylene glycol monomethyl ether |
| | with 8 t Fe (of which 0.9 t as Fe(II) (higher than at start-up due to Fe-addition during operation) |
| | 19 t Cl |
| | 10 t H₂O (range: 10–20 t) |

(3) Scrubbing column or scrubbing:
flue gas throughput: 400,000 m³/h (eff.) = 111 m³/s

TABLE 1

| | Flue Gas | | Scrubbed Gas | | Purification Efficiency | | Gas Throughput | Scrubbing Agent Throughput | Ratio |
|---|---|---|---|---|---|---|---|---|---|
| Test No. | NO Vppm | SO₂ Vppm | NO Vppm | SO₂ Vppm | NO % | SO₂ % | l/h | l/h | Gas:Liquid |
| 1 | 544 | 685 | 23 | 20 | 95 | 97 | 292 | 1.1 | 265 |
| 2 | 491 | 600 | 23 | 20 | 94 | 96 | 332 | 1.1 | 302 |
| 3 | 490 | 600 | 160 | 40 | 67 | 93 | 332 | 0.32 | 1040 |

TABLE 2

| | Flue Gas | | Scrubbed Gas | | Purification Efficiency | | Gas Throughput | Scrubbing Agent Throughput | Ratio |
|---|---|---|---|---|---|---|---|---|---|
| Test No. | NO Vppm | SO₂ Vppm | NO Vppm | SO₂ Vppm | NO % | SO₂ % | l/h | l/h | Gas:Liquid |
| 1 | 758 | 500 | 37 | 0 | 95 | 100 | 274 | 0.82 | 344 |
| 2 | 1170 | 3000 | 29 | 25 | 97.5 | 99 | 119 | 0.82 | 145 |
| 3 | 1040 | 1000 | 22 | 40 | 97.9 | 96 | 274 | 0.33 | 830 |

TABLE 3

| | Flue Gas | | Scrubbed Gas | | | Purification Efficiency | | Gas Throughput (eff.) | Scrubbing Agent Throughput | Ratio |
|---|---|---|---|---|---|---|---|---|---|---|
| Test No. | NO Vppm | SO₂ Vppm | O₂ V% | NO Vppm | SO₂ Vppm | NO % | SO₂ % | l/h | l/h | Gas:Liquid |
| 1 | 544 | 685 | 5.2 | 23 | 20 | 95 | 97 | 292 | 1.1 | 265 |
| 2 | 491 | 600 | 4.6 | 23 | 20 | 94 | 96 | 332 | 1.1 | 302 |
| 3 | 490 | 600 | 4.6 | 160 | 40 | 67 | 93 | 332 | 0.32 | 1040 |
| 4 | 971 | 1000 | 4.8 | 340 | 40 | 66 | 96 | 156 | 0.32 | 488 |
| 5 | 970 | 1000 | 4.8 | 183 | 30 | 81 | 97 | 158 | 1.10 | 144 |
| 6 | 550 | 600 | 4.7 | 91 | 35 | 83 | 94 | 270 | 1.70 | 159 | circulation scrubbing agent: 800 m³/h
scrubbing agent filling volume: 160 m³
temperature: 25-30° C.
(4) Result:

| Products (stoichiom.): | 440 kg/h NHO₃ |
|---|---|
| | 1310 kg/h H₂SO₄ |
| purification efficiency for NO | over 90% |
| purification efficiency for SO₂ | over 95% |

(5) Regeneration column or regeneration:

| stripping steam: | 7000 m³/h (eff.) |
|---|---|
| circulation scrubbing solution: | 800 m³/h |
| temperature: 105° C. | |
| 157 m³/h = 210 kg/h NO | |
| 300 m³/h = 860 kg/h SO₂ | |

(6) Continuous addition of reducing agent:
Fe: 0.3 t/d
HCl: 1.8 t/d (33%)=0.6 t/d HCl
(7) Removal of salt from a partial stream of the scrubbing agent:
(a) Precipitation with sodium hydroxide solution and evaporation of water, which is drawn off by the head and liquefied in a water condenser 41. The bottom liquid flows into a decanter 42, where NaCl settles, which is transferred by pipe 43 into a dump site, while desalted scrubbing agent arrives at pipe 5 by pipe 33.

Slurry from decanter 37 is transferred by pipe 4 into a third agitated vessel 45 and there once more is mixed with water (pipe 46). A separation into scrubbing agent and slurry occurs in a decanter 47. The scrubbing agent arrives at pipe 38 through pipe 48, while the slurry is carried by pipe 49 to a dump site

| Scrubbing agent to be treated | 8.1 t/d |
|---|---|
| NaOH (e.g. 50% solution) | 0.82 t/d |
| HCl (e.g. 33% solution) | 0.16 t/d |
| solvent (make-up) | 0.10 t/d |
| washing water (de-ionized) | 2.0 t/d |
| precipitating Fe(OH)₃ (water-free) | 0.58 t/d |
| precipitating NaCl (water-free) | 1.21 t/d |

(b) Vacuum distillation

| scrubbing agent to be treated | 8.1 t/d |
|---|---|
| distillate incl. HCl | 90% |
| extraction of the residue | 90% |
| solvent (make-up) | 0.10 t/d |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for removal of an atmospheric pollutant from a gas, said atmospheric pollutant being at least one of $NO_x$ and $SO_2$, comprising
contacting said gas mixture with a scrubbing agent so as to remove said at least one of $NO_x$ and $SO_2$ from said gas, said scrubbing agent including iron(II) ions and a substantially water-free nonaqueous solvent and
wherein said nonaqueous solvent is selected from the group consisting of dimethyl sulfoxide, phosphoric or phosphonic esters, a compound of formula I or II, or mixtures thereof $$R_1-CH_2-CHR_2-R_3 \qquad (I)$$

whereby $R_1$ = OH
= O alkyl
= keto group
or = ester group $$R_2 = \overset{|}{\underset{|}{C}}-$$

= H
or = OH
$R_3$ = CH₂OH
= OH
= O alkyl
= keto group
= ester group
= alkyl O (cyclic)
= (O—CH₂—CH₂)ₙ—O alkyl
or = (O—CH₂—CH₂—CH₂)ₙ—O alkyl
with n = 1 to 10;

$$R_4-CH_2-CH_2-CH_2-R_5 \qquad (II)$$

whereby $R_4$ = OH
= O alkyl
= keto group
or = ester group
$R_5$ = OH
= O alkyl
= keto group
= ester group
= (O—CH₂—CH₂—CH₂)ₙ—O alkyl
or = (O—CH₂—CH₂)ₙ—O alkyl
with n = 1 to 10.

2. A process according to claim 1, wherein, after contacting said gaseous mixture, said scrubbing agent is regenerated and recycled.

3. A process according to claim 1, wherein said pollutant comprises NO.

4. A process according to claim 1, wherein said nonaqueous solvent is tetrahydrofurfuryl alcohol, tetraethylene glycol dimethyl ether or acetonylacetone.

5. A process according to claim 2, wherein said nonaqueous solvent is tetrahydrofurfuryl alcohol, tetraethylene glycol dimethyl ether or acetonylacetone.

6. A process according to claim 1, wherein said nonaqueous solvent is phosphoric mono-, di- or triester.

7. A process according to claim 2, wherein said nonaqueous solvent is phosphoric mono-, di- or triester.

8. A process according to claim 1, wherein said nonaqueous solvent is phosphonic mono- or diester.

9. A process according to claim 2, wherein said nonaqueous solvent is phosphonic mono- or diester.

10. A process according to claim 1, wherein the scrubbing agent contains a maximum of about 20% by weight of water.

11. A process according to claim 2, wherein the scrubbing agent contains a maximum of about 20% by weight of water.

12. A process according to claim 10, wherein the scrubbing agent contains a maximum of about 10% by weight of water.

13. A process according to claim 11, wherein the scrubbing agent contains a maximum of about 10% by weight of water.

14. A process according to claim 1, wherein halide ions are added to the scrubbing agent.

15. A process according to claim 14, wherein said halide ions are chloride ions.

16. A process according to claim 2, wherein halide ions are added to the scrubbing agent.

17. A process according to claim 16, wherein said halide ions are chloride ions.

18. A process according to claim 2, wherein an oxidation inhibitor is added to the scrubbing agent.

19. A process according to claim 18, wherein said oxidation inhibitor is 4,4'-butylidenebis(6-tert-butyl-m-cresol).

20. A process according to claim 19, wherein about 0.1-1% by weight 4,4'-butylidenebis(6-tert-butyl-m-creosol) is added to the scrubbing agent.

21. A process according to claim 2, wherein the scrubbing agent contains about 0.1 to 1% by weight of acid.

22. A process according to claim 2, wherein Fe(III) ions are added to the scrubbing agent.

23. A process according to claim 2, wherein aqueous hydroxylamine hydrochloride solution is added to the scrubbing agent.

24. A process according to claim 2, wherein metallic iron is added to the scrubbing agent.

25. A process according to claim 2, wherein the $NO_x$ and $SO_2$ are both scrubbed out in a single process stage.

26. A process according to claim 2, wherein NO and $SO_2$ are scrubbed out in two separate process stages.

27. A process according to claim 2, wherein regeneration of the scrubbing agent is performed by blowing steam, an inert gas or mixtures thereof into the scrubbing agent.

28. A process according to claim 2, wherein regeneration of the scrubbing agent is performed by lowering the pressure over the scrubbing agent.

29. A process according to claim 2, wherein regeneration of the scrubbing agent is performed by heating the scrubbing agent.

30. A process according to claim 2, wherein NO is released during regeneration and is converted to $NHO_3$.

31. A process according to claim 2, wherein $SO_2$ is released during regeneration and is converted to $H_2SO_4$.

32. A process according to claim 30, wherein $SO_2$ is released during regeneration and is converted to $H_2SO_4$.

33. A process according to claim 2, wherein NO is released during regeneration and is reacted with $NH_3$ to $N_2$.

34. A process according to claim 27, wherein a part of regeneration scrubbing agent is diverted, subjected to a cathode reduction of the Fe(III) ions contained therein to thereby form Fe(II) ions and again fed back to the rest of the scrubbing agent.

35. A process according to claim 28, wherein a part of regenerated scrubbing agent is diverted, subjected to a cathode reduction of the Fe(III) ions contained therein to thereby form Fe(II) ions and again fed back to the rest of the scrubbing agent.

36. A process according to claim 29, wherein a part of regenerated scrubbing agent is diverted, subjected to a cathode reduction of the Fe(III) ions contained therein to thereby form Fe(II) ions and again fed back to the rest of the scrubbing agent.

37. A process according to claim 30, wherein a part of regenerated scrubbing agent is diverted, subjected to a cathode reduction of the Fe(III) ions contained therein to thereby form Fe(II) ions and again fed back to the rest of the scrubbed agent.

38. A process according to claim 27, wherein a part of regenerated scrubbing agent is diverted and subjected to a vacuum distillation for separation of the solvent from the other components of the scrubbing agent and the solvent distilled off is fed back to the rest of the scrubbing agent.

39. A process according to claim 28, wherein a part of regenerated scrubbing agent is diverted and subjected to a vacuum distillation for separation of the solvent from the other components of the scrubbing agent and the solvent distilled off is fed back to the rest of the scrubbing agent.

40. A process according to claim 29, wherein a part of regenerated scrubbing agent is diverted and subjected to a vacuum distillation for separation of the solvent from the other components of the scrubbing agent and the solvent distilled off is fed back to the rest of the scrubbing agent.

41. A process according to claim 30, wherein a part of regenerated scrubbing agent is diverted and subjected to a vacuum distillation for separation of the solvent from the other components of the scrubbing agent and the solvent distilled off is fed back to the rest of the scrubbing agent.

42. A process according to claim 27, wherein a part of the regenerated scrubbing agent is diverted, mixed with aqueous NaOH solution for precipitation of Fe(III) salts and, after separation of Fe(III) salts, is fed back to the rest of the scrubbing agent.

43. A process according to claim 28, wherein a part of the regenerated scrubbing agent is diverted, mixed with aqueous NaOH solution for precipitation of Fe(III) salts and, after separation of Fe(III) salts, is fed back to the rest of the scrubbing agent.

44. A process according to claim 29, wherein a part of the regenerated scrubbing agent is diverted, mixed with aqueous NaOH solution for precipitation of Fe(III) salts and, after separation of Fe(III) salts, is fed back to the rest of the scrubbing agent.

45. A process according to claim 30, wherein a part of the regenerated scrubbing agent is diverted, mixed with aqueous NaOH solution for precipitation of Fe(III) salts and, after separation of Fe(III) salts, is fed back to the rest of the scrubbing agent.

46. A process according to claim 34, wherein about 0.01 to 0.1% by weight of the circulating scrubbing agent is diverted.

47. A process according to claim 1, wherein said solvent is

| | |
|---|---|
| about 60–80% wt | tetraethytene glycol dimethyl ether |
| about 15–25% wt | triethylene glycol dimethyl ether |
| about 2.5–7.5% wt | pentaethylene glycol dimethyl ether |
| about 2.5–7.5% wt | pentaethylene glycol monomethyl ether. |

48. A process according to claim 2, wherein said solvent is

| | |
|---|---|
| about 60–80% wt | tetraethytene glycol dimethyl ether |
| about 15–25% wt | triethylene glycol dimethyl ether |
| about 2.5–7.5% wt | pentaethylene glycol dimethyl ether |
| about 2.5–7.5% wt | pentaethylene glycol monomethyl ether. |

49. A process according to claim 1, wherein said scrubbing agent is essentially devoid of thiosulfate ions.

50. The process according to claim 1, wherein said scrubbing agent has a concentration of thiosulfate ions which is below about 1 g/l.

51. A process according to claim 1, wherein the scrubbing agent has an $Fe^{+2}$ concentration of about 0.04-1 mole/l.

52. A process according to claim 1, wherein the scrubbing agent has an $Fe^{+2}$ concentration of about 0.04-0.5 mole/l.

53. A process according to claim 1, wherein the scrubbing agent has an $Fe^{+2}$ concentration of about 0.1-0.2 mole/l.

54. A process according to claim 1, wherein said gas prior to its contact with the scrubbing agent has an $NO_x$ concentration of about 80-2,000 vppm.

55. The process according to claim 54, wherein the gas after contact with the scrubbing agent has an $NO_x$ content of about 1-8 vppm.

56. The process according to claim 54, wherein the gas after contact with the scrubbing agent has an $NO_x$ content of about 10-50 vppm.

57. A process according to claim 1, wherein the scrubbing agent contains a maximum of about 20% by weight of water.

58. A process according to claim 1, wherein the scrubbing agent contains a maximum of about 10% by weight of water.

59. A process according to claim 1, wherein said nonaqueous solvent is not an alcohol or a glycol.

60. A process according to claim 2, wherein said nonaqueous solvent is not an alcohol or a glycol.

61. A process for removal of $SO_2$ from a gaseous mixture comprising contacting said gaseous mixture with a scrubbing agent so that $SO_2$ is removed from said gaseous mixture, said scrubbing agent including a solvent selected from the group consisting of dimethyl sulfoxide, phosphoric or phosphonic esters, a compound of formula I or II, or mixtures thereof

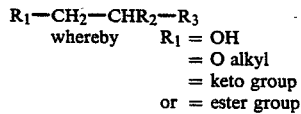
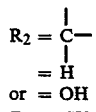
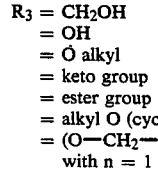

-continued
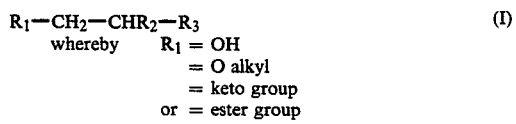

62. A process for removal of an atmospheric pollutant from a gas, said atmospheric pollutant comprising $NO_x$ and $SO_2$, comprising contacting said gas with a scrubbing agent so that $NO_x$ and $SO_2$ are removed from said gas, said scrubbing agent consisting essentially of
(a) iron(II) ions in sufficient amounts to bind substantially all of the $NO_x$ contained in said gas in an iron(II) complex and remove $SO_2$ from said gas and
(b) a substantially water-free nonaqueous solvent wherein said nonaqueous solvent is selected from the group consisting of dimethyl sulfoxide, phosphoric or phosphonic esters, a compound of formula I or II, or mixtures thereof

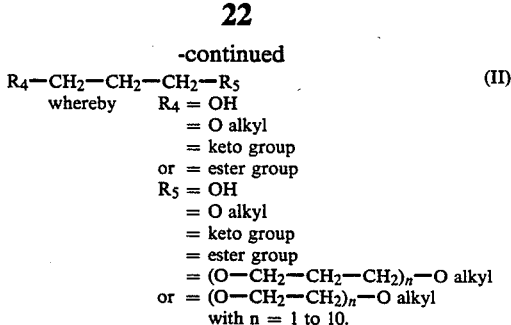
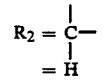
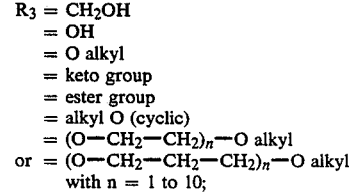

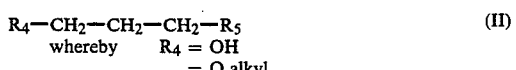
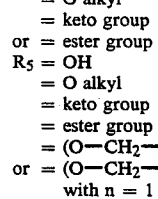

63. A process according to claim 1, wherein the scrubbing agent has an $Fe^{+2}$ concentration of about 0.04-1 mole/l.

64. A process according to claim 1, wherein the scrubbing agent has an $Fe^{+2}$ concentration of about 0.04-0.5 mole/l.

65. A process according to claim 1, wherein the scrubbing agent has an $Fe^2$ concentration of about 0.1-0.2 mole/l.

* * * * *